(12) United States Patent
Stapleton et al.

(10) Patent No.: US 6,712,273 B1
(45) Date of Patent: Mar. 30, 2004

(54) VERSATILE METHOD AND SYSTEM FOR VCSEL-BASED BAR CODE SCANNER

(75) Inventors: Norman B Stapleton, Princeton, TX (US); Ronnie Lynn Warkentine, Wylie, TX (US); Ronald W. Chandler, Plano, TX (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/644,258

(22) Filed: Aug. 22, 2000

(51) Int. Cl.[7] ................................................. G06K 7/10
(52) U.S. Cl. ........................ 235/462.49; 235/462.45
(58) Field of Search ...................... 235/462.49, 462.45

(56) References Cited

U.S. PATENT DOCUMENTS

| | | | |
|---|---|---|---|
| 4,833,336 A | 5/1989 | Kraske | |
| 5,196,683 A | 3/1993 | Marom et al. | |
| 5,278,397 A | * 1/1994 | Barkan et al. | 235/462.49 |
| 5,349,172 A | 9/1994 | Roustaei | |
| 5,528,810 A | 6/1996 | Eddy et al. | |
| 5,777,314 A | * 7/1998 | Roustaei | 235/462.12 |
| 5,974,066 A | 10/1999 | Wu et al. | |
| 6,033,090 A | 3/2000 | Seo | |
| 6,062,476 A | 5/2000 | Stern et al. | |

FOREIGN PATENT DOCUMENTS

| | | |
|---|---|---|
| DE | 30 27 769 A1 | 2/1992 |
| JP | 223990 | * 10/1986 |
| JP | 9-50476 | 2/1997 |
| TW | 297889 | 2/1997 |

OTHER PUBLICATIONS (Translated) Decision of the Taiwan Intellectual Property Office, dated Jul. 10, 2003, relative to Taiwan Application No. 090120823, a foreign equivalent to the instant U.S. application 09/644,258.

PCT International Search Report, dated Feb. 13, 2002, relative to International Application PCT/US 01/26200, the PCT counterpart to U.S. Application 09/644,258.

* cited by examiner

*Primary Examiner*—Harold I. Pitts
(74) *Attorney, Agent, or Firm*—Andrew A. Abeyta

(57) ABSTRACT

A versatile system and method for VCSEL (vertical cavity surface emitting laser) bar code and data scanning is disclosed, including a housing (102) having a scanning surface (116), a detector element (106) disposed within the housing in close proximity and normal to the scanning surface, a VCSEL component (104) disposed within the housing in close proximity to the detector element and scanning surface, and an aperture (122) formed within the housing between the scanning surface and the detector element.

24 Claims, 4 Drawing Sheets

VERSATILE METHOD AND SYSTEM FOR VCSEL-BASED BAR CODE SCANNER

BACKGROUND OF THE INVENTION

The present invention relates, in general, to data coding and, in particular, to a versatile system for Vertical Cavity Surface-Emitting Laser (VCSEL)-based bar code reading and scanning.

Bar code scanning is used in a vast array of commercial and industrial applications for convenient and efficient transfer of data and information. As requirements for faster processing of greater amounts of information have increased, efforts have been made to increase the efficiency and effectiveness of bar code scanning. In general, the amount and efficiency of information that a particular bar code can transfer is limited by the minimum required width of any individual bar (i.e. the pitch) in that code. As the minimum required bar width decreases (i.e. a smaller pitch is achieved), a greater number of bars can be coded in a given space. Thus, the amount of data coded in that given space, using small pitch bar coding, is increased, resulting in a more efficient system.

One major limitation on small pitch bar coding is the resolution of bar code reading systems. Where a bar code reading system lacks sufficient resolution to accurately distinguish small pitch bar codes, data transfer becomes unreliable and error prone. It is, thus, desirable to provide accurate and reliable small pitch bar code reading.

Conventional small pitch bar code reading and scanning systems generally use lasers in conjunction with optical lensing to generate and concentrate sufficient illumination on the media to be scanned and enable scanning of small pitch lines. Such systems usually suffer from optical inefficiency (due to the lensing), consume a relatively large amount of power (to compensate for the inefficiency), and are costly as a result of the extra componentry. Most conventional laser scanning systems also have a scan pattern that limits the total bar code width. One well-known variety of laser bar code scanner, sometimes referred to as free-space scanners (e.g., a retail cash register scanner), usually comprises a relatively large amount of componentry used to manipulate the laser beam back and forth across the bar code for proper reading. Some such systems employ lasers and multiple rotating mirrors to accomplish reading. These systems, while capable of reading small pitch bar codes, are very expensive and highly impractical for anything but retail applications. For most non-retail applications, a close-proximity bar code scanning system will suffice, rendering most conventional laser scanning systems highly inefficient.

Other conventional scanning and reading systems have utilized standard infrared and visible LEDs (light emitting diodes) as light sources for bar code scanning and reading. Again, such systems are limited as they require significantly more power (i.e. LED current) and optical lensing to provide sufficient illumination to produce a usable read signal. This results in increased space requirements and system costs. Also, such scanning systems are typically less accurate on small pitch bar codes, as they are generally limited by the size of the LED source, which is relatively large in comparison to the pitch of the bar code. Thus, LED-based scanning systems can also suffer from accuracy and reliability problems.

Further complicating the efficiency and performance of conventional bar code scanning, clocking systems have generally added to the complexity and cost of conventional systems while providing very restrictive clocking schemes and scenarios. Clocking is important, especially in bar code scanning, for accurate data transfer. Most bar code systems rely on manual movement of the bar code in relation to the scanner: either the bar code is passed over the stationary scanner, or the scanner is passed over the stationary bar code. Accurate interpretation of the bar code depends on the ability to differentiate individual bar widths. Unless a fixed, constant-rate scanning speed is guaranteed, some sort of reference signal (i.e. a clocking signal) must be utilized to time the scanning. Some conventional systems have relied on pre-set fixed-rate scanning, usually employing some sort of internal clocking system independent of the bar coding. This approach adds to system cost and complexity. Other conventional systems have relied on clocking signals read as part, or in conjunction with, a particular bar code. Typically, though, the relatively poor resolution of such systems either required a slow scan rate or tolerance for greater system unreliability.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

A versatile system for scanning or reading small pitch bar code and other similarly formatted data in a cost-effective, highly accurate and reliable manner while minimizing power consumption is now needed; providing readily adaptable close-proximity scanners and readers while overcoming the aforementioned limitations of conventional methods.

In the present invention, a VCSEL component and a detector are provided in close or predefined proximity to a media-reading area such that the detector receives diffuse angle reflections from the VCSEL component off a media being scanned; providing highly accurate small pitch scanning and reading in a highly cost-effective and readily adaptable manner.

The present invention provides a data scanning device comprising a housing having a scanning surface, a detector element disposed within the housing normal to the scanning surface, an aperture formed within the housing between the scanning surface and the detector element, and a laser source disposed within the housing adjoining the aperture.

The present invention also provides a diffuse reflective bar code reading system comprising a housing having a scanning surface, a detector element disposed within the housing in close proximity and normal to the scanning surface, a VCSEL component disposed within the housing in close proximity to the detector element and scanning surface, and an aperture formed within the housing between the scanning surface and the detector element.

The present invention further provides a method of optoelectronic data scanning, comprising the steps of providing a scanning surface having a target area, providing an optoelectronic detector disposed in close proximity and normal to the target area, providing a VCSEL component disposed in close proximity to the detector element and target area, adapted to source light to the target area from a diffuse angle, and receiving VCSEL-sourced light reflected from the target with the detector.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

It should be understood that the principles and applications disclosed herein can be applied in a wide range of optoelectronic applications. The present invention solves problems associated with reading bar code type information of varying media types, inks, and surfaces, while minimizing power consumption and system costs. The present invention provides for greater bar code printing density. The present invention can incorporate a clocking channel, providing accurate reading independent of scan speed or bar code spacing tolerances. The present invention can be applied in a number of surface scanning applications, as well as applications requiring the accuracy of a clocking channel or low-power consumption. For example, the present invention could be applied in a variety of high-accuracy edge detection applications (e.g., printers, copiers), directional analysis applications, and rotary or linear encoder/decoders. For purposes of explanation and illustration, the present invention is hereafter described in reference to close proximity bar code scanning or reading system. The system of the present invention can be deployed in a fixed position scanning assembly, or in a movable reading assembly (e.g. a pen-type wand).

The present invention utilizes a Vertical Cavity Surface Emitting Laser (VCSEL) as a light source. The VCSEL is rapidly becoming a workhorse technology for semiconductor optoelectronics. VCSELs can typically be used as light emission sources anywhere other laser sources are used and provide a number of advantages to system designers. Hence, VCSELs are emerging as the light source of choice for modern high speed, short-wavelength communication systems and other high-volume applications, such as optical encoders, reflective/transmissive sensors and optical read/write applications. Inherently low cost of manufacture, enhanced reliability, non-astigmatic and circularly symmetric optical output are just some of the advantages of VCSELs over traditional laser sources.

Within the context of the present invention, a number of VCSEL characteristics are particularly desirable and advantageous. VCSELs can provide a source beam having substantial light intensity, without requiring additional lensing or amplification, in a focused area with low-beam divergence. Additionally, VCSEL sources are well suited for low-beam angle applications. The benefits of these characteristics are more fully appreciated in reference to FIGS. 1–4.

Figure 1:
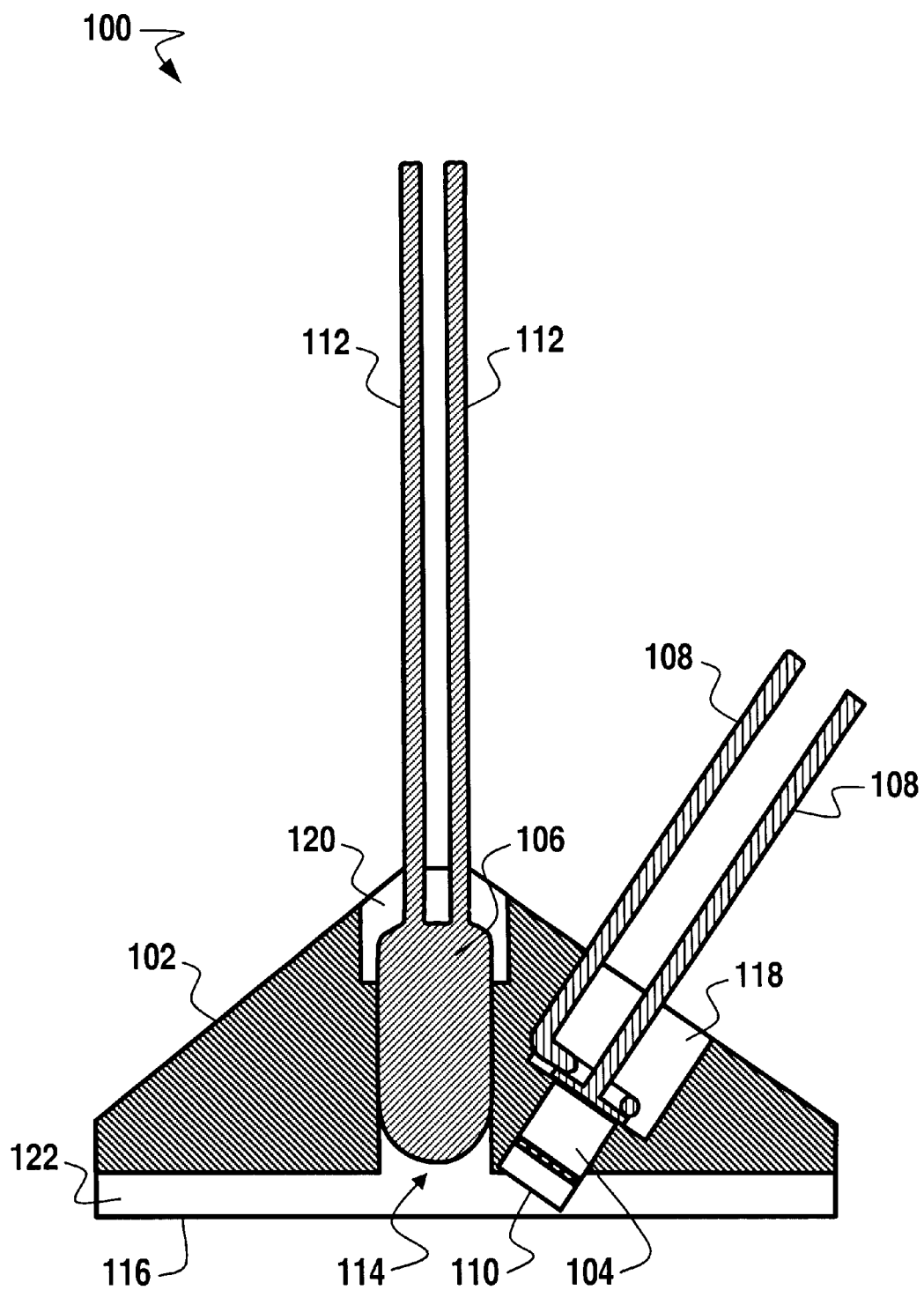
FIG. 1 is an illustrative diagram of a data scanning device according to the present invention.
Figure 2:
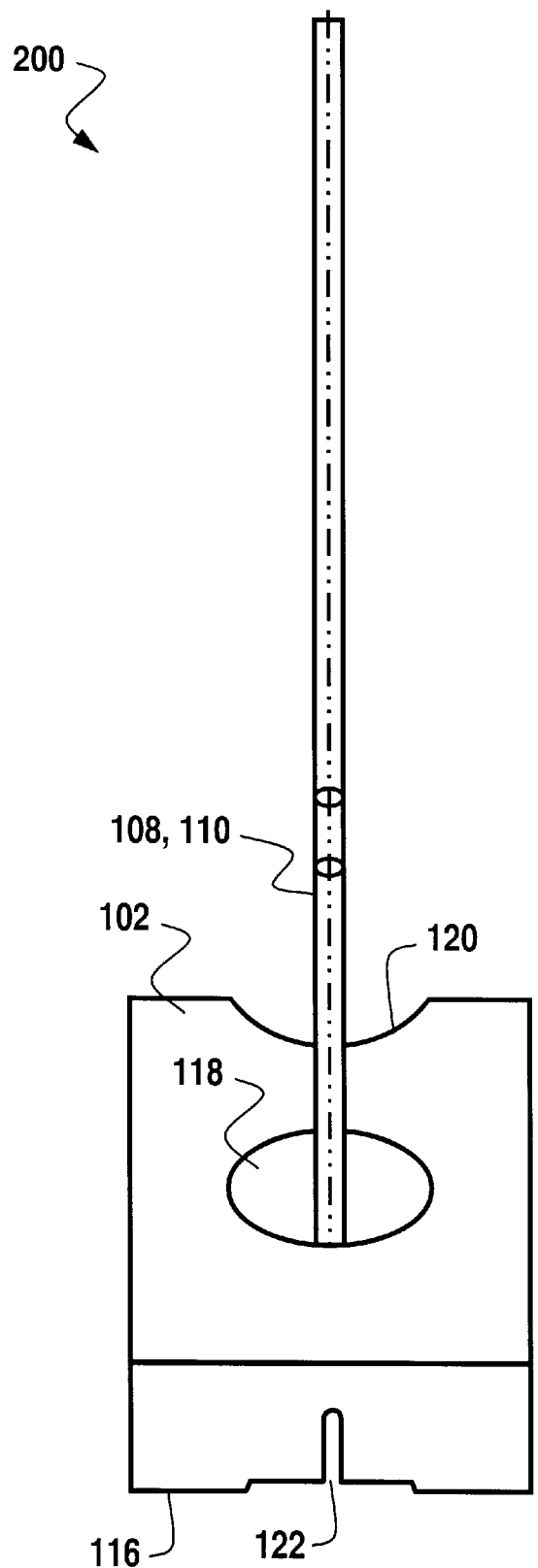
FIG. 2 is a side-view schematic of the device from FIG. 1.

Referring now to FIG. 1, aspects of the present invention are illustrated in one embodiment of a reading assembly 100 according to the present invention. Assembly 100 comprises a housing 102, a VCSEL component 104, and a detector component 106. As depicted, VCSEL component 104 can comprise a hermetic VCSEL in a flat window package having control leads 108 and sourcing light from surface 110. As depicted, detector element 106 can comprise a silicon photodetector in a T-1 package having control leads 112 and receiving light within acceptance area 114. Housing 102 can be formed with a scanning surface 116 and chambers 118 and 120, into which components 104 and 106 are disposed, respectively. Housing 102 also has formed therein a light restricting aperture 122. As illustrated in FIG. 2, which depicts a side view 200 of assembly 100, aperture 122 can comprise a narrow slot or slit traversing the scanning surface 116.

Operationally, a particular bar code or other similar media to be read is passed along surface 116, in direct contact or very close proximity thereto. A desired media can be passed along a fixed-position assembly 100, or alternatively, a movable assembly 100 can be passed along a desired media. When a printed pattern is passed along surface 116, assembly 100 can distinguish not only high-uality printed bars (e.g., those produced by laser printers), but can also discriminate other print and media surface features (e.g., offset printing on newsprint). Elements 104 and 106 are disposed within housing 102, and aperture 122 is formed such that acceptance area 114 of detector 106 receives only light diffused from a target area on the desired media (not shown), and all specular and stray light is blocked or ignored. This target area is generally a very small space just below surface 116, centered directly under acceptance area 114. Elements 104 and 106 are disposed within housing 102 in very close proximity to scanning surface 116 (e.g., 0.02"–0.05"). VCSEL 104 is disposed within housing 102 at an angle sufficient to maximize the diffuse light reflected from the target area. Because the maximum intensity reflection is desired normal to the target area (at acceptance area 114), and because the intensity of reflection is a function of the cosine of the angle at which the light is reflected from the desired media, VCSEL 104 is disposed at an angle to and a distance from surface 116 sufficient to maximize diffuse reflection from the media normal to the target area. Other factors can be varied to provide desired reflective properties and behavior. The dimensioning of aperture 122 can be altered to restrict the intensity and field of light reaching detector 106, providing user-definable resolution. For example, in a system similar to assembly 100, providing aperture 122 widths between 0.01" and 0.005" could provide for line and spacing resolutions of between approximately 0.008" and 0.004", respectively. In general, the smaller aperture 122 is formed to be, the finer (and better) the system resolution will be. Alternatively, VCSEL 104 can be selected or designed to provide a particular wavelength of light, providing for optimal dimensioning and forming of assembly 100.

As depicted, components 104 and 106 can be directly coupled to host control or analytical equipment (e.g., a microprocessor or digital signal processor) via leads 108 and 110, respectively. In most applications, no signal amplification will be required, reducing power consumption requirements of a system. Furthermore, no A/D conversion will be required since the present invention can provide direct digital input into host control or analytical equipment. Additionally, the present invention thus provides the ability to design using low voltage devices, further reducing system power requirements and costs while improving system reliability.

Housing 102 can be formed by any suitable method or process (e.g., injection molding), and can be pre-formed for later insertion of components 104 and 106, or formed around or concurrently with those components. Housing 102 can itself constitute a stand-alone reader/scanner structure, or it can be one element of some other reader/scanner structure (e.g., a pen-type wand assembly). Detector 106 can comprise any suitable contrivance for receiving reflected light and transmitting corresponding signals. For example, detector 106 can comprise a silicon photodetector in a different package (e.g., can-type package) or a flat-panel window-type detector. Similarly, VCSEL component 104 can be packaged or arranged in any suitable manner (e.g., a single VCSEL surface mounted on a substrate). Thus assembly 100 can be adapted, modified, and formed in a number of ways comprehended by the present invention. For example, housing 102, detector 106 and VCSEL 104 can be formed or disposed on a single substrate using suitable semiconductor processing technologies.

Figure 3:
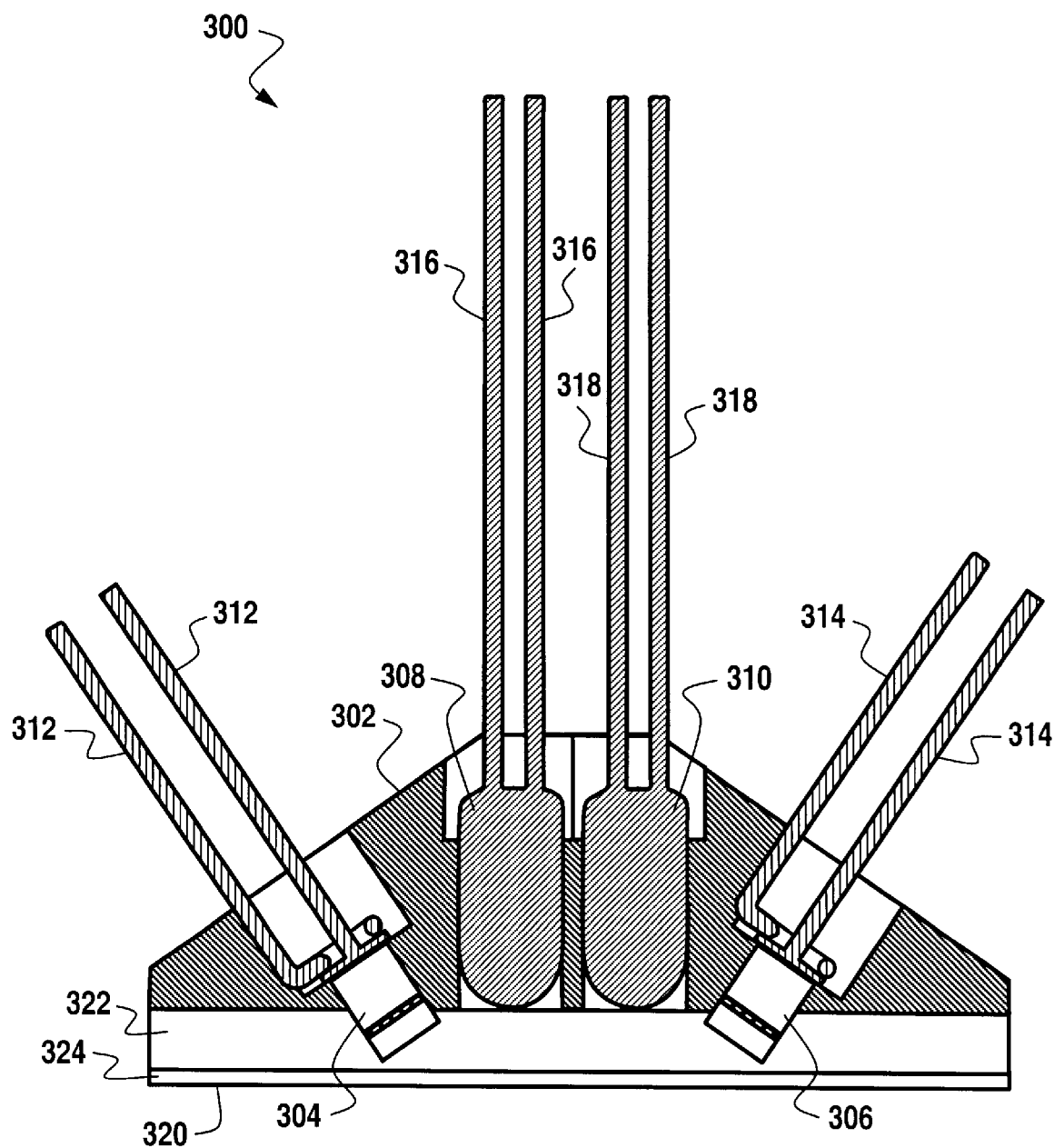
FIG. 3 is an illustrative diagram of another data scanning device according to the present invention.

Referring now to FIG. 3, another embodiment of a scanner/reader system 300 in accordance with the present invention is illustrated. Assembly 300 can be considered to comprise dual assemblies 100. The present invention thus provides two channels; one of which can be used for clocking purposes and other can be used for data retrieval. More specifically, assembly 300 comprises a housing 302, a first VCSEL component 304, a second VCSEL component 306, a first detector component 308 and a second detector component 310. As depicted, VCSEL components 304 and 306 can comprise hermetic VCSELs in flat-window packages having control leads 312 and 314, respectively. As depicted, detector components 308 and 310 can comprise silicon photodetectors in T-1 packages having control leads 316 and 318, respectively. Housing 302 is formed with scanning surface 320 and light restricting aperture 322. The detectors, VCSELs, and aperture are formed or disposed such that detector 308 receives only reflected light generated by VCSEL 304, and detector 310 receives only reflected light generated by VCSEL 306. As depicted in FIG. 3, there is no barrier within aperture 322 between the two channels. Assembly 300 is configured such that any stray light from VCSEL 304 reflected off a desired media would be outside the acceptance angle of detector 310, and likewise, stray light from VCSEL 306 reflected off a desired media would be outside the acceptance angle of detector 308. In some embodiments, however, it may be desirable to design the application such that light generated by VCSEL 304 is received by detector 310 and light generated by VCSEL 306 is received by detector 308.

Alternatively, some suitable barrier could be formed or disposed between the two channels if desired. Optionally, assembly 300 further comprises a barrier 324 formed or disposed within housing 302 and spanning aperture 322. Barrier 324 can be provided to protect the detectors and VCSELs from hazards associated with continual operation (e.g., collection of paper dust) that may impair the performance of assembly 300. Barrier 324 can be formed of a suitable material (e.g., plastic or glass), selected such that its physical properties will not interfere with the diffuse reflection operation of the VCSELs and detectors. Generally, specular reflections from a plastic or glass material will not impact the diffuse reflection operation of the present invention.

Figure 4:
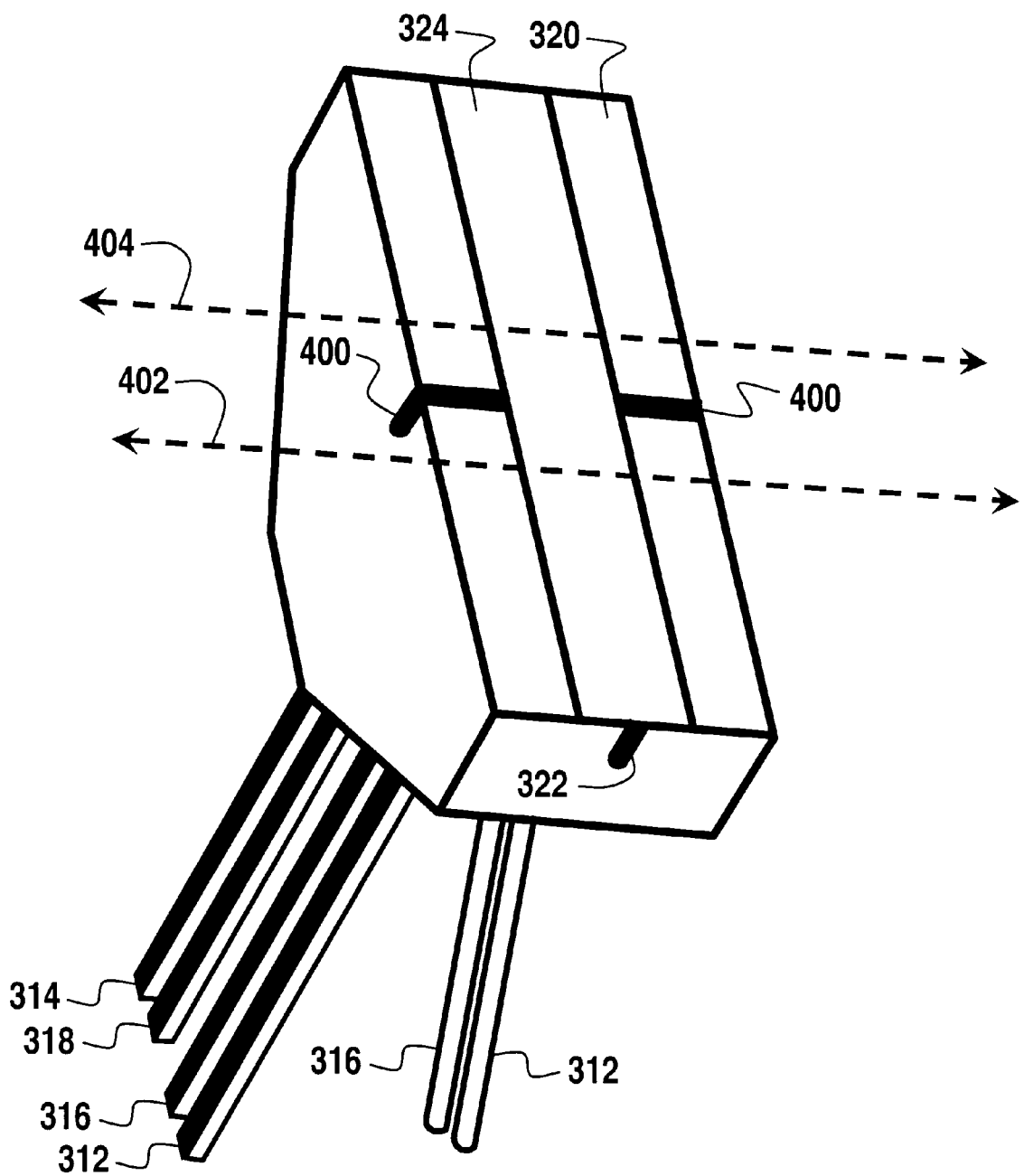
FIG. 4 is a plan-view schematic of the device from FIG. 3.

FIG. 4 provides an illustration of the operation of assembly 300. A center line between the two channels is denoted by indicators 400. Indicators 400 are shown for illustrative purposes and do not have to be incorporated in assembly 300. Alternatively, indicators 400 can comprise some visible marking (e.g., ink dot) or can comprise an additional aperture formed normal to aperture 322. Data to be read by the first channel, VCSEL 304 and detector 308, is generally passed along the path indicated by indicator 402. Data to be read by the second channel, VCSEL 306 and detector 310, is generally passed along the path indicated by indicator 404. Media can be passed continuously across surface 320, as the present invention imposes no maximum length restriction on the bar code or surface analyzed.

The present invention thus provides capacity for multiple scanning/reading channels in a single assembly and so provides in a simple and cost-effective manner. Utilizing the teaching of the present invention, any desired number of channels can be incorporated into a scanning assembly based on particular design requirements (e.g., multi-channel linear or rotary encoding).

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. For example, laser sources other than VCSEL components can be utilized based on particular design requirements, provided that they source light in a manner consistent with the teaching of the present invention. The description as set forth is not intended to be exhaustive nor to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The embodiments of an invention in which an exclusive property or right is claimed are defined as follows:

1. A scanning device comprising:
   a housing having a scanning surface and an aperture;
   a detector proximate to the aperture; and
   a vertical cavity surface emitting laser (VCSEL) light source proximate to the aperture; and
   wherein:
      said VCSEL has an axis of emission that is at an angle relative to the scanning surface; and
      the angle of the axis of emission is at a magnitude such that light diffused from a target area approximately parallel to the scanning surface is at about maximum intensity.

2. The device of claim 1, wherein said VCSEL and said detector are situated between approximately 0.05 cm. (0.02 in.) and 0.13 cm. (0.05 in.) from the scanning surface.

3. The device of claim 1, the aperture has a width between approximately 0.013 cm. (0.005 in.) and 0.025 cm. (0.01 in.).

4. The device of claim 1, wherein the device has a line and space reading resolution between approximately 0.010 cm. (0.004 in.) and 0.020 cm. (0.008 in.).

5. The device of claim 1, wherein said VCSEL and detector need no optics.

6. The device of claim 5, wherein the output of the device is digital without a need of an analog to digital conversion.

7. The device of claim 6, wherein said VCSEL and said detector are formed on one substrate. surface and covering the aperture.

8. The device of claim 7, wherein the device needs only low voltage to function.

9. A scanning device comprising:
   a housing having a scanning surface, a first aperture and a second aperture;
   a first detector proximate to the first aperture, and
   a first vertical cavity surface emitted laser (VCSEL) proximate to the first aperture; and
   a second detector proximate to the second aperture; and
   a second VCSEL proximate to the second aperture;
   wherein
      said first VCSEL has an axis of emission that is at an angle relative to the scanning surface; and
      the angle of the axis of emission is at a magnitude such that light diffused from a target area approximately parallel to the scanning surface is at about maximum intensity as may be sensed by said first detector.

10. The device of claim 9, wherein:
    said first VCSEL and first detector are for data retrieval; and
    said second VCSEL and second detector are for clocking purposes.

11. A scanning means comprising:
    means for sourcing laser light;
    means for detecting light; and
    means for housing said means for sourcing laser light, said means for detecting light, a scanning surface proximate to said means for sourcing laser light, and an aperture situated in the scanning surface; and
    wherein:
       said means for sourcing laser light has an axis of emission that is at an angle relative to the scanning surface; and
       the angle of the axis of emission is of a magnitude such that light diffused from a target area approximately parallel to the scanning surface is at about maximum intensity.

12. The means of claim 11, wherein the laser light is from a VCSEL.

13. The means of claim 12, wherein said means for detecting light has an axis of detection that is approximately perpendicular to the scanning surface.

14. A scanning device comprising:
    a plurality of VCSELs;
    a plurality of detectors; and
    a housing containing said plurality of VCSELs and said plurality of detectors, and having a scanning surface and at least one aperture situated in the scanning surface; and
    wherein:
       at least one VCSEL of said plurality of VCSELs has an axis of emission that is at an angle relative to the scanning surface; and
       the angle of the axis of emission is of a magnitude such that light diffused from a target area approximately parallel to the scanning surface is at about maximum intensity.

15. The device of claim 14, wherein at least one detector of said plurality of light detectors has an axis of detection approximately perpendicular to the scanning surface.

16. A method for scanning comprising:
    sourcing laser light of a VCSEL onto a target area at an angle relative to the target area;
    detecting light from the target area; and
    adjusting the angle of the sourcing laser light relative to the target area so that the light diffused from the target area that is being detected is approximately at a maximum intensity.

17. The method of claim 16, wherein the target area has at least one one-dimensional mark.

18. The method of claim 17, wherein the detecting light from the target area is performed with line and space reading resolution between approximately 0.010 cm. (0.004 in.) and 0.020 cm. (0.008 in.).

19. The method of claim 18, wherein the detecting light is performed in a direction approximately perpendicular to the target area.

20. A scanning device comprising:
    a scanning surface having an aperture;
    a detector proximate to the aperture; and
    a laser light source proximate to the aperture; and
    wherein:
       said laser light source has an axis of emission that is at an angle relative to the scanning surface; and
       the angle of the axis of emission is at a magnitude such that light diffused from a target are approximately parallel to the scanning surface is at about maximum intensity.

21. The device of claim 20, wherein said laser light source is a VCSEL.

22. A scanning device comprising:
    a housing having a scanning surface, a first aperture and a second aperture;
    a first detector proximate to the first aperture; and
    a first laser light source proximate to the first aperture; and
    a second detector proximate to the second aperture; and
    a second laser light source proximate to the second aperture;
    wherein:
       said first laser light source and first detector are for data retrieval; and
       said second laser light source and second detector are for clocking.

23. The device of claim 22 wherein:
    said first laser light source has an axis of emission that is at an angle relative to the scanning surface; and
    the angle of the axis of emission is at a magnitude such that light diffused from a target area approximately parallel to the scanning surface is at about maximum intensity as may be sensed by said first detector.

24. The device of claim 23, wherein said first and second laser light sources are VCSELs.

* * * * *